United States Patent
Kazmi et al.

(10) Patent No.: US 10,200,243 B2
(45) Date of Patent: *Feb. 5, 2019

(54) METHOD AND APPARATUS FOR OPERATING CONFIGURATION ADAPTATION FOR INTERRUPTION OF SIGNAL TRANSMISSION

(71) Applicant: Telefonaktiebolaget LM Ericsson (publ), Stockholm (SE)

(72) Inventors: Muhammad Kazmi, Bromma (SE); Joakim Axmon, Kävlinge (SE); Walter Müller, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,291

(22) Filed: Sep. 18, 2017

(65) Prior Publication Data

US 2018/0013623 A1   Jan. 11, 2018

Related U.S. Application Data

(63) Continuation of application No. 13/701,222, filed as application No. PCT/SE2012/051151 on Oct. 25, 2012, now Pat. No. 9,794,118.

(Continued)

(51) Int. Cl.
   *H04L 12/24* (2006.01)
   *H04W 28/06* (2009.01)
   (Continued)

(52) U.S. Cl.
   CPC ......... *H04L 41/0816* (2013.01); *H04W 24/04* (2013.01); *H04W 28/06* (2013.01); *H04W 28/18* (2013.01)

(58) Field of Classification Search
   CPC .................................................... H04W 28/06
   See application file for complete search history.

(56) References Cited

U.S. PATENT DOCUMENTS

| 6,937,641 B2 | 8/2005 | Li et al. |
| 9,794,118 B2 * | 10/2017 | Kazmi et al. ......... H04W 28/06 370/254 |

(Continued)

FOREIGN PATENT DOCUMENTS

WO    2009101349 A1    8/2009

OTHER PUBLICATIONS

"3GPP TS 36.214 V10.1.0 (Mar. 2011)", 3rd Generation Partnership Project; Technical Specification Group Radio Access Network; Evolved Universal Terrestrial Radio Access (E-UTRA); Physical layer; Measurements (Release 10); 3GPP TS 36.214 V10.1.0 (Mar. 2011); pp. 1-13, 1-13.

(Continued)

*Primary Examiner* — Mohammad S Anwar
*Assistant Examiner* — Angel T Brockman
(74) *Attorney, Agent, or Firm* — Murphy, Bilak & Homiller, PLLC

(57) ABSTRACT

The operating configuration at a node in a wireless communication network, at a neighboring node in the network, and/or at one or more wireless devices supported by the network, is updated based on determining timing information for an impending interruption of a radio link in the network to avoid erroneous operation during the impending interruption, which interruption is associated with an external system. The determination of interruption timing, which may be inferred, e.g., from detecting prior interruptions, or which may be known from information about the external system, and the modification of the operating configuration(s) permits the network to operate with greater (Continued)

stability, control, and accuracy during the interruptions than would be possible if the interruptions were simply treated as intermittent radio link failures.

2 Claims, 5 Drawing Sheets

Related U.S. Application Data

(60) Provisional application No. 61/564,663, filed on Nov. 29, 2011.

(51) Int. Cl.
*H04W 24/04* (2009.01)
*H04W 28/18* (2009.01)

(56) References Cited

U.S. PATENT DOCUMENTS

| | | |
|---|---|---|
| 2004/0029545 A1 | 2/2004 | Anderson et al. |
| 2007/0189191 A1* | 8/2007 | Ades .................. H04L 41/0806 370/254 |
| 2008/0240322 A1 | 10/2008 | Date |
| 2010/0157975 A1 | 6/2010 | In et al. |
| 2011/0021153 A1 | 1/2011 | Safavi et al. |
| 2011/0274040 A1 | 11/2011 | Pani et al. |
| 2011/0319120 A1 | 12/2011 | Chen et al. |
| 2013/0083695 A1* | 4/2013 | Narasimha ........ H04W 74/0841 370/254 |
| 2013/0170396 A1* | 7/2013 | Dinan ............... H04W 72/1231 370/254 |

OTHER PUBLICATIONS

"3GPP TS 37.320 V10.3.0 (Sep. 2011)", 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); 1-17.

\* cited by examiner

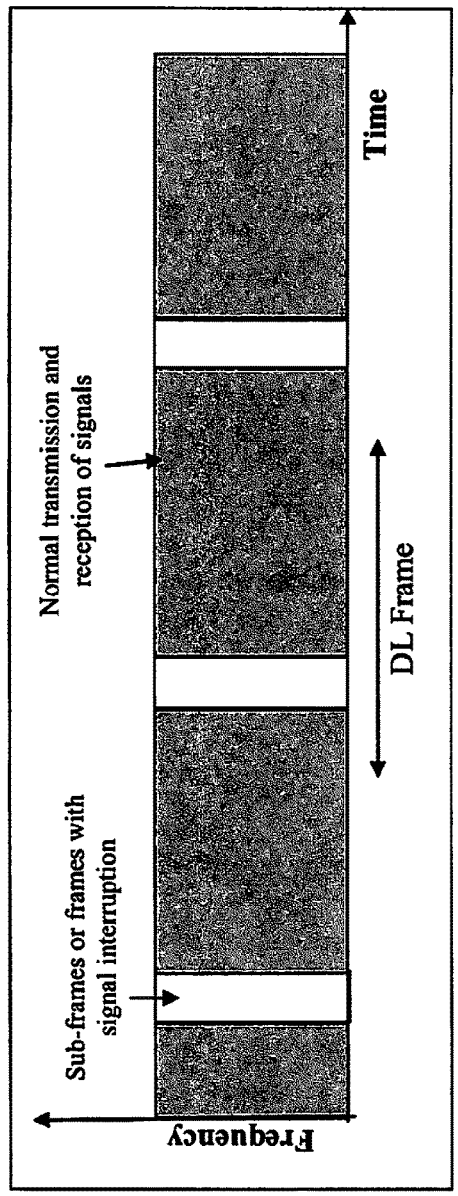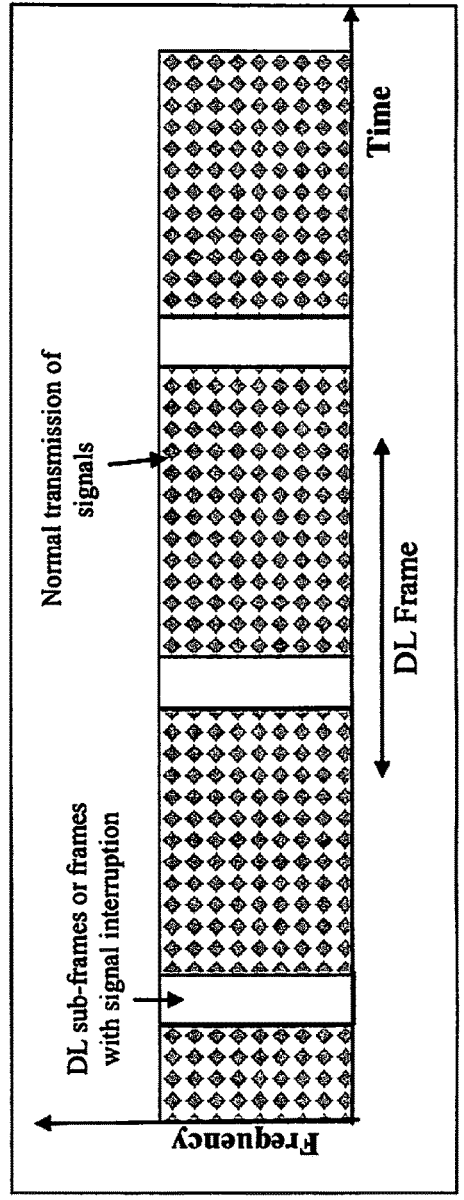

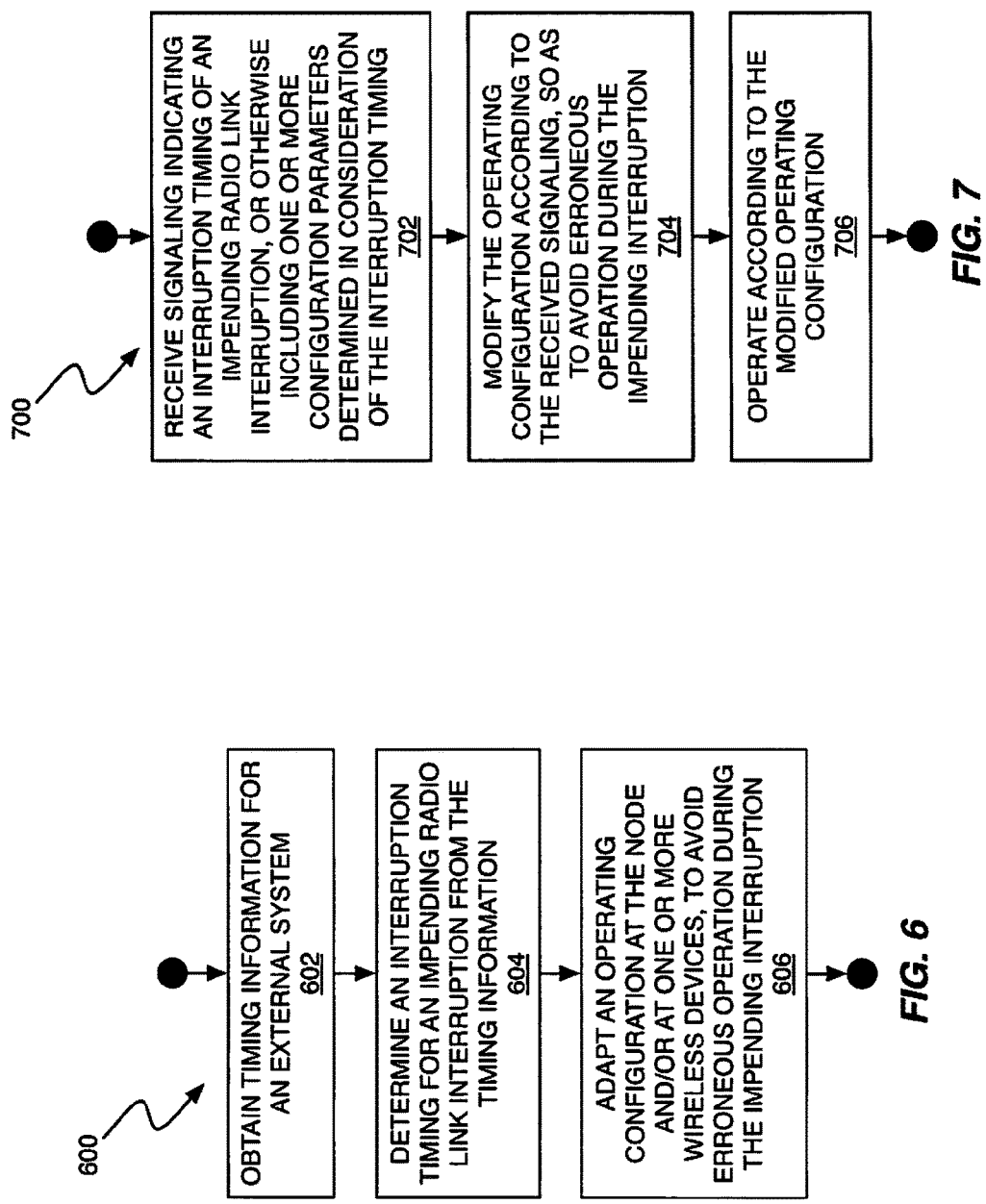

METHOD AND APPARATUS FOR OPERATING CONFIGURATION ADAPTATION FOR INTERRUPTION OF SIGNAL TRANSMISSION

RELATED APPLICATIONS

This application is a continuation of U.S. application Ser. No. 13/701,222 filed Nov. 30, 2012, which is a U.S. National Phase Application of PCT/SE2012/051151 filed Oct. 25, 2012, which claims benefit of U.S. Provisional Application No. 61/564,663 filed Nov. 29, 2011. The entire contents of each of the aforementioned applications are incorporated herein by reference.

TECHNICAL FIELD

The present invention generally relates to wireless communication networks and particularly relates to adapting the operating configuration of one or more nodes in the wireless communication network with respect to radio link interruptions.

BACKGROUND

Measuring received signal strength or making other forms of radio link measurements represents a relatively common aspect of on-going operations between nodes in a wireless communication network. In networks based on the Third Generation Partnership Project, "3GPP", Long Term Evolution, "LTE", specifications, for example, items of user equipment, "wireless device 30s", make periodic or triggered measurements on various signals. These measurements support link adaptation for best efforts service—e.g., modulation and coding scheme selections to dynamically tailor transmission data rates or other transmission aspects as a function of radio link quality.

Further, on-going radio link measurements support mobility management, such as where the wireless device 30s report signal quality with respect to various base stations—"eNodeB s" in the LTE nomenclature—in support of dynamically selecting which cells in the network are used to serve the wireless device 30s. Similarly or additionally, radio link measurements support positioning operations, either by the wireless device 30s or by the network. Further, self-organizing network, "SON", procedures depend on dynamically determining relative radio link qualities, as do operations for Minimization of Drive Time or "MDT", Closed Subscriber Group or "CSG" cells, etc.

Additional scenarios involving generally recurring radio link measurements include Carrier Aggregation or "CA" service, wherein service to a given wireless device 30 involves simultaneous transmission on more than one carrier. The term Component Carrier or "CC" describes each of the individual carriers used in a CA scenario. CCs may be contiguous in frequency or may be non-contiguous in frequency. When all of the CCs involve the same Radio Access Technology or "RAT", the CA scenario is referred to as "inter-RAT CA". The term "inter-RAT CA" applies in scenarios involving more than one RAT—i.e., two or more of the CCs aggregated for service come from different RATs. Common CA scenarios include the use of Distributed Antenna Systems or "DAS", the use of Remote Radio Heads, "RRHs", and Coordinated Multi-Point or "CoMP" configurations, which provide service via a coordinated set of cells.

In another LTE-specific example, the network transmits different types of signals at pre-defined times. Synchronization signals—Primary Synchronization Signals or "PSS" and Secondary Synchronization Signals or "SSS"—are sent in subframes one (1) and five (5). Further, Cell Reference Signals or "CRS" are transmitted in every subframe—e.g., at symbol times zero (0), four (4), seven (7) and e11, or a subset thereof in case of special subframes or MBSFN subframes. Similarly, system information—including the Master Information Block or "MIB" and the System Information Block 1 or "SIB1"—is sent in pre-defined subframes. Likewise, Positioning Reference Signals or "PRS" are sent in predefined subframes, e.g., in six consecutive subframes every 160 ms, to facilitate Observed Time Difference of Arrival or "OTDOA" positioning and wireless device 30s are correspondingly requested to perform Received Signal Received Power, "RSRP", or other such measurements at the appropriate times.

The above measurements and other operating activities presume the availability of the involved signals, at least at the times when measurements are performed. Consequently, interruptions of the involved radio links can cause unreliable behavior, e.g., inaccurate radio signal measurements inadvertently taken during instances of radio link interruption, improper determinations of synchronization or loss of synchronization arising from signal loss during radio link interruption, etc.

SUMMARY

The operating configuration at a node in a wireless communication network, at a neighboring node in the network, and/or at one or more wireless devices supported by the network, is updated based on determining timing information for an impending interruption of a radio link in the network to avoid erroneous operation during the impending interruption, which interruption is associated with an external system. The determination of interruption timing, which may be inferred, e.g., from detecting prior interruptions, or which may be known from information about the external system, and the modification of the operating configuration(s) permits the network to operate with greater stability, control, and accuracy during the interruptions than would be possible if the interruptions were simply treated as intermittent radio link failures.

In an example, a node in a wireless communication network is configured to perform a method that comprises obtaining timing information for an external wireless system whose operation is associated with intermittent interruptions of a radio link of the wireless communication network. The method includes determining interruption timing from the timing information, wherein the interruption timing is referenced to a radio-link timing and indicates an impending interruption of the radio link. Non-limiting examples of radio link timing includes frame and/or subframe numbers or counts indicating specific transmission or reception intervals corresponding to the impending interruption.

Additionally, the method includes adapting, based on the timing information, an operating configuration at any one or more of the nodes, a neighboring node, and one or more wireless devices in communication with the wireless communication network, to avoid erroneous operation during the impending interruption. In a non-limiting example, the node is a radio network node such as a base station and its operating configuration is adapted to avoid erroneous operation during the impending interruption. Additionally or alternatively, the operating configuration of a neighboring base station is so adapted and/or the operating configuration of one or more wireless devices is so adapted. Adaptation of the operating configuration at the neighboring node and/or the wireless devices is based on, e.g., signaling sent from the node that determined the timing of the impending interruption.

In another example, a wireless device is configured for operation in a wireless communication network, and it includes one or more processing circuits that are configured to perform a method that includes receiving signaling indicating an interruption timing for an impending interruption of a radio link, or otherwise includes one or more configuration parameters determined in consideration of the interruption timing. The method further includes modifying an operating configuration of the wireless device according to the signaling, so that the wireless device will avoid erroneous operation during the impending interruption, and correspondingly operating according to the modified operating configuration.

As one non-limiting example of operating with a modified operating configuration, the wireless device avoids making measurements on the radio link during the interruption, and/or takes advantage of the interruption to make measurements on another radio link that is not interrupted. On the network side, a non-limiting example of operating with a modified operating configuration includes a base station or other radio network node that adjusts its scheduling of users—wireless devices—to avoid scheduling users on the radio link during the interruption. Of course, these scheduling decisions are prospective, i.e., they are advantageously taken in advance of the interruption based on the interruption timing determined.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 2-4 are diagrams of example periodic interruptions of only uplink and/or downlink signals, as may be experienced as a result of radio link interruption associated with an external system.

FIG. 6 is a logic flow diagram of one embodiment of a method implemented by the node of FIG. 5, for example.

FIG. 7 is a logic flow diagram of one embodiment of a method implemented by the wireless device of FIG. 5, for example.

DETAILED DESCRIPTION

Figure 1:
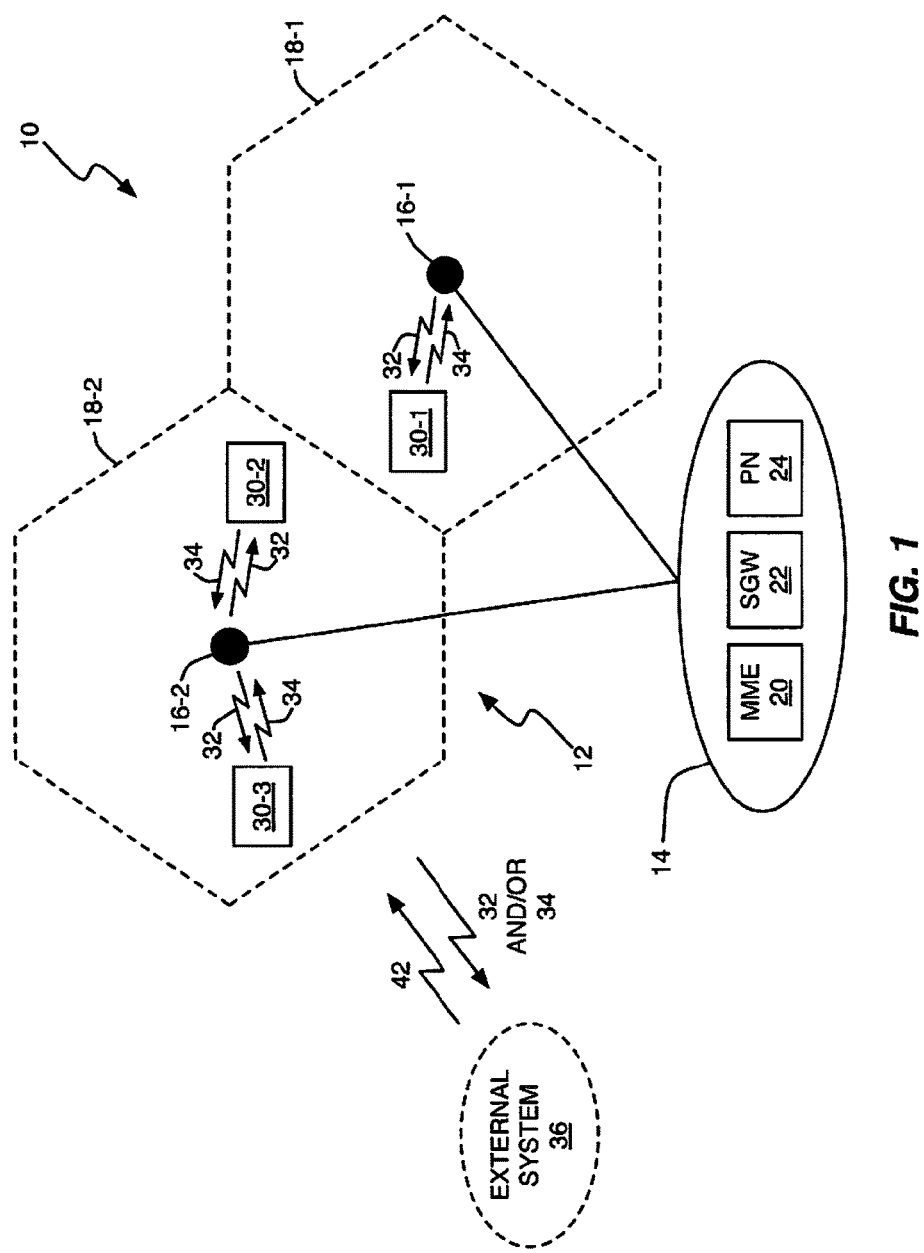
FIG. 1 is a diagram of one embodiment of a wireless communication network that includes one or more base stations or other nodes that are configured according to the teachings herein with respect to adapting their operating configurations to avoid erroneous operation during radio link interruptions.

FIG. 1 illustrates an example wireless communication network 10. The network 10 may be configured according to UTRAN or E-UTRAN specifications, or according to other wireless communication technology standards. In the simplified illustration, the network 10 includes a Radio Access Network or "RAN" 12 and a Core Network or "CN" 14. The RAN 12 includes a number of base stations 16 providing communication service in a number of cells 18. The base station 16-1 provides service for the cell 18-1 and, likewise, the base station 16-2 provides service in the cell 18-2.

There may, of course, be more base stations 16 and cells, and there may be a mix of base station and cell types—e.g., the network 10 may include heterogeneous elements, such as where one or more low power nodes such as micro base stations provide cells overlaid on a larger macro cell provided by a higher power node such as a macro base station. Similar variations are also possible in the CN 14, which in the example includes: a Mobility Management Entity or "MME" 20 to manage handovers and other mobility events for wireless devices 30 operating within the RAN 12; a Serving Gateway or "SGW" 22 to provide packet service and routing functions between such devices 30 and/or with other devices or systems in various external networks to which the CN 14 communicatively couples; and a Positioning Node or "PN" 24 to provide positioning functions for location-based services, emergency location determination, etc.

A given wireless device 30 in the "connected" state generally has at least one cell 18 in the network 10 that operates as the "serving" cell 18 for the wireless device 30, although with Carrier Aggregation or "CA", there may be multiple cells 18 used in serving a given wireless device 30, such as in a Coordinated Multi-Point or "CoMP" service scenario. One therefore sees downlink signals 32 from the various base stations 16 to respective ones of the illustrated wireless devices 30, shown by way of example as 30-1, 30-2, and 30-3. Similarly, FIG. 1 depicts uplink signals 34 from the wireless devices 30 to the base stations 16.

It will be appreciated that the downlink signals 32 and uplink signals 34 represent radio links in which a number of physical layer channels carry potentially many logical channels used for control signaling and for dedicated and/or shared data transmissions. For purposes of this disclosure, a "radio link" generally comprises one or more physical layer signals in the uplink or downlink direction. Thus, an "interruption" of a radio link represents an instance or window of time during which such signal is absent—not transmitted—or is interfered with to an extent that disruption of signal reception occurs or is likely to occur.

In FIG. 1, there is an external system 36 that is associated with recurring interruptions of the downlink and/or uplink signals 32 and 34 in one or more of the cells 18 in the network 10. For simplicity of discussion, the downlink signals 32 and uplink signals 34 in any given cell 18 are also referred to as "radio link 32" and "radio link 34". Thus, the external system 36, which is not part of the RAN 12 is associated with recurring interruptions of the radio link 32 and/or radio link 34 in one or more of the cells 18.

Figure 4:
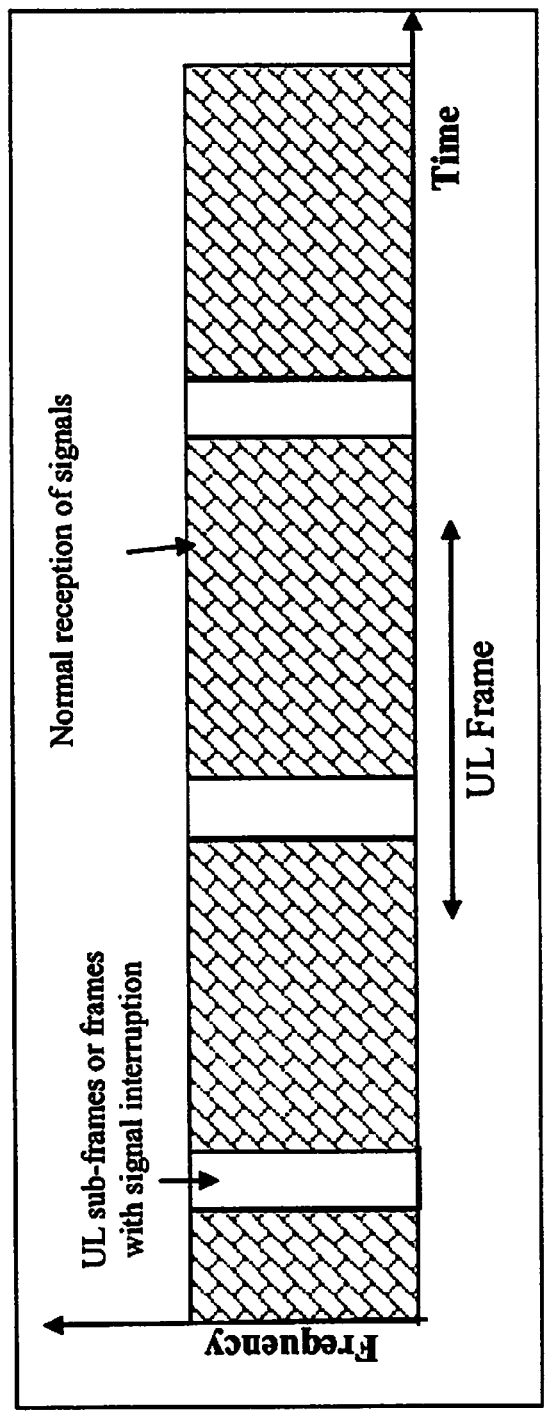

In an example case, the external system 36 intermittently generates a signal 42 that significantly interferes with the radio links 32 or 34 in one or more of the cells 18. In another example case, transmissions by the network 10 on the radio links 32 and/or 34 are disruptive to the external system 36 and are thus suspended at certain times, to avoid interfering with the external system at critical instants. In example cases, the external system 36 is a radar system or medical system. In any case, such suspensions may not be network-wide and not all of the base stations 16 or other entities operating in the network 10 may be aware of such suspensions. FIGS. 2-4 illustrate example radio link interruptions, with FIGS. 2 and 3 showing example interruptions of downlink frames or subframes, and with FIG. 4 showing example interruptions of uplink frames or subframes. These figures are illustrative and not limiting and it should be understood that the timing and pattern of interruption can vary markedly from these examples. Note, too, that the signal interruption may also be caused over only part of the cell transmission and/or reception bandwidth.

Figure 5:
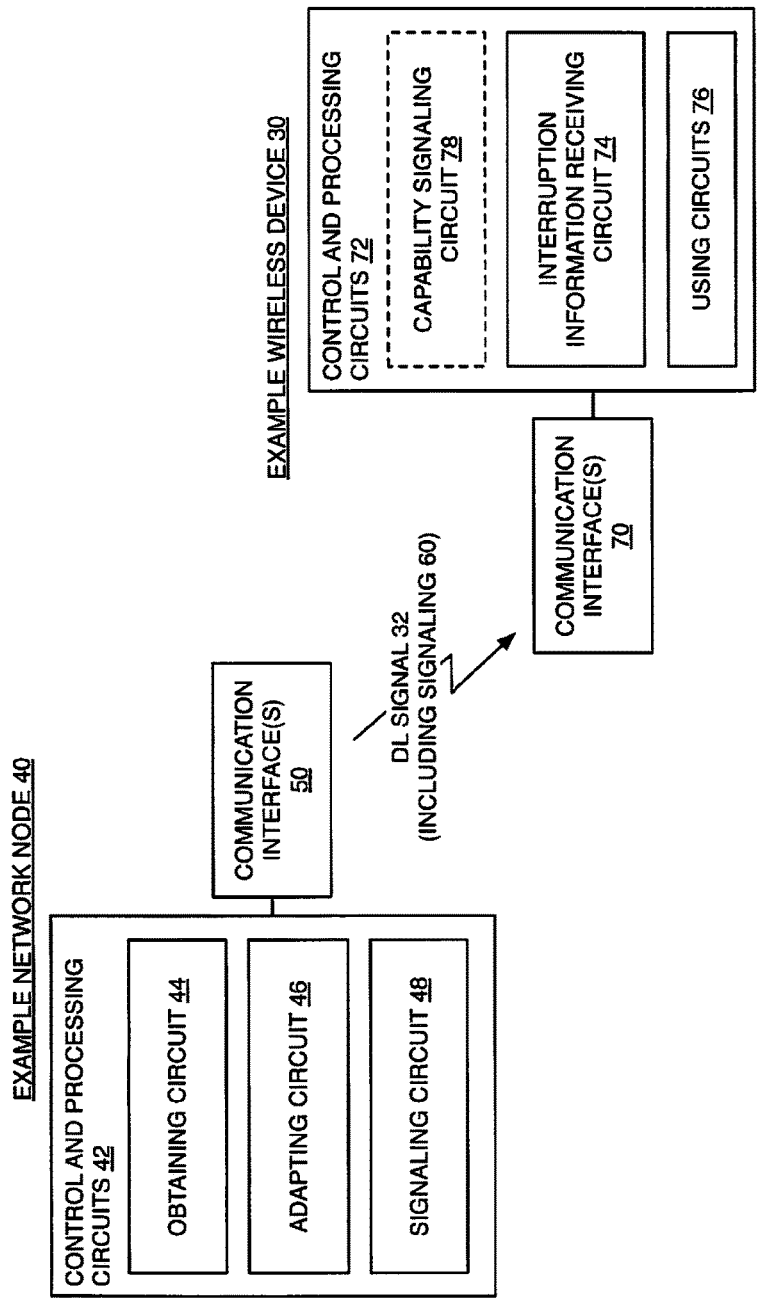
FIG. 5 is a block diagram of one embodiment of a node configured for operation in a wireless communication network and a corresponding wireless device, where the node and the device are configured according to the teachings herein with respect to adapting their operating configurations to avoid erroneous operation during radio link interruptions.

Advantageously, in view of either interruptions caused by interference from the external system 36 or interruptions to avoid interfering with the external system 36, one or more of the base stations 16 or other network nodes in the network 10, and one or more of the wireless devices 30, are configured to modify their operating configurations to avoid erroneous operation during these types of radio link interruptions. The contemplated operating configuration modifications "manage" the interruptions more intelligently than would otherwise happen if the basic radio link failure processing protocols within the network nodes and wireless devices 30 were relied upon. Further, the handling of radio link interruptions as contemplated herein intelligently addresses the problem arising from the interruption of radio links that would not trigger radio link failure processing in convention nodes and devices FIG. 5 illustrates an example network node 40, which may be a base station 16, for example. The node 40 is configured for operation in the network 10 and comprises one or more communication interfaces 50 configured to communicate with one or more wireless devices 30, and further configured to communicate with one or more other nodes 40 in the network 10. In an example, the communication interfaces 50 include RF transceiver circuitry for communicating with wireless devices 30 via radio links 32 and 34, and include an inter-base station and/or CN communication interface, for communicating with neighboring base stations 16 and/or with nodes in the CN 14, such as the MME 20, SGW 22 and/or PN 24.

The example node 40 further includes one or more processing circuits 42, which are operatively associated with the communication interfaces 50 and which are labeled as "Control and Processing Circuits" in the diagram. These processing circuits 42 may include fixed circuitry, programmable circuitry, or both.

In at least one example, the processing circuits 42 are configured to obtain timing information for an external system 36 whose operation is associated with intermittent interruptions of a radio link 32 and/or 34 of the wireless communication network 10. The processing circuits 42 are further configured to determine an interruption timing from the timing information, wherein the interruption timing is referenced to a radio link timing and indicates an impending interruption of the radio link 32, 34.

In an example of such a processing configuration, the "timing information" comprises absolute timing, such as the duration and intervals known or detected for interruptions associated with the external system 36. This type of timing information is "mapped" or otherwise translated into an interruption timing, which is expressed in the context of the radio network timing, such as by determining which frames or subframes will be affected by the impending interruption, and indicating the frame and/or subframe numbers corresponding to the impending interruption. Such indications, for example, may be specific to the specific radio links 32 and/or 34 that are known or assumed to be affected by the impending interruption, or they may be referenced to a specific cell 18 or reference timing.

The interruption timing may comprise a reference time, periodicity of interruption, duration or width of each interruption, total time period over which the signal interruption may occur etc. The total time period over which the signal interruption may occur can be expressed in terms of total number of periodic interruptions if they are periodic. For example, a reference time to indicate the interruption may be expressed in terms of Sequence Frame Number or "SFN" of that cell or of a reference cell. The reference cell can for example be a pre-defined cell.

In another example, the interruption timing to indicate the impending interruption of a radio link 32 and/or 34 in a cell 18 is expressed in terms of absolute timing, or with respect to a pre-defined source etc. The timing information may also comprise of an indication whether the cell timing (e.g., uplink and/or downlink frame timing) will be the same or will be drifted due to interruption. In case there is drift or change in timing, then the interruption timing information may also include the amount of timing drift in the downlink and/or uplink in a cell 18, e.g., a drift value of −2 µs might be indicated.

The interruption timing information may additionally include the part of cell bandwidth, e.g., transmission and/or reception bandwidth that will be affected by the impending interruption. Equivalently, the interruption timing information can indicate the part of cell bandwidth that will not be affected—i.e., not interrupted. In particular, the interruption timing information needs to contain more detailed information than would be needed in the case of "normal" cell deactivations, e.g., as part of energy-saving procedures carried out by the network 10.

Generally, it will be understood that the interruption timing however expressed comprises information that is meaningful in the context of the nodes 40 and/or wireless devices 30 that are communicating on, measuring, or otherwise monitoring one or more of the radio links 32 or 34 that will be affected by the impending interruption.

The processing circuits 42 are further configured to adapt, based on the timing information, an operating configuration at any one or more of the node 40, a neighboring node 40 and the one or more wireless devices 30, to avoid erroneous operation during the impending interruption. For example, if the node 40 is a base station 16-1, it may adapt its own operating configuration in view of the impending interruption, or adapt the operating configuration of a neighboring base station 16-2 or 16-3, such as by sending inter-base station signaling indicating the interruption timing and/or one or more configuration parameters determined in consideration of the impending interruption. Additionally, or alternatively, the base station 16-1 adapts the operation of one or more wireless devices 30, by sending signaling to the wireless devices 30 that indicates the interruption timing and/or includes one or more configuration parameters determined in consideration of the impending interruption.

In more detail, in some embodiments, the one or more processing circuits 42 at least functionally comprise an obtaining circuit 44 that is configured to obtain the timing information regarding the external system 36, e.g., by parsing or otherwise processing signaling received at the node 40 that conveys such information, or by tracking recurring interruptions of the radio link 32 and/or 34 as they occur and determining timing information from that tracking.

The processing circuits 42 further include an adapting circuit 46, which is configured to adapt an operating configuration of the node 40 and/or a neighboring node 40 or wireless device 30, to avoid erroneous operation at the node 40, neighboring node 40, or wireless device 30 during the interruption. In an example case, the adapting operation comprises calculating or otherwise determining a configuration value that controls an aspect of operation that would be impaired or negatively affected by the interruption. The configuration value is set in consideration of the timing of the impending interruption to avoid or modify the controlled operation in such a way that erroneous operation during the interruption is avoided.

As noted, the node 40 may modify its own operating configuration or that of a neighboring node or wireless device 30. To that end, the processing circuits 42 include a signaling circuit 48 that is operatively associated with the adapting circuit 46 and with the communication interface(s) 50. The signaling circuit 48 is configured to send signaling 60 indicating the interruption timing or otherwise including one or more configuration parameters determined by the node 40 in consideration of the interruption timing. Such signaling 60 may be sent to any number of wireless devices 30, thereby enabling them to adjust their corresponding operations to avoid erroneous operation during the impending interruption.

In an example of adapting its own operating configuration, the processing circuits 42 of the node 40 are configured to adapt the operating configuration by adapting user scheduling operations at the node 40 according to the interruption timing, to avoid scheduling transmissions to or from the one or more wireless devices 30 during the impending interruption. Again, where the node 40 is a base station 16 or other network node responsible for user scheduling, the scheduling controller or other processing entity included in the base station 16 or other node incorporates the interruption timing into the collection of variables considered in making ongoing uplink and/or downlink scheduling decisions.

Several approaches are considered for obtaining the timing information for the external system 36. In one embodiment, the one or more processing circuits 42 are configured to obtain the timing information for the external system 36 by receiving the timing information from another node 40 in the wireless communication network 10. In one example, neighboring base stations 16 exchange such information. In another example, the CN 14 sends the timing information to a base station 16.

In another approach, the one or more processing circuits 42 are configured to obtain the timing information by detecting a recurring timing of radio link interruptions. This approach can be understood as a form of blind detection, wherein the processing circuits 42 detect and characterize interruptions of one or more radio links 32 and 34. In one example, the node 40 comprises a base station 16 and the RF transceiver circuitry or associated processing logic in the base station 16 is configured to detect instances of interference that are above a defined interference power or signal-to-interference (SIR) threshold and/or persist for more than a defined time window, and further to track the times between such events. Such tracking allows the node 40 to determine the temporal and/or frequency patterns of recurring interference and to map those patterns into radio network timing terms, e.g., frame/subframe numbers, etc.

For example, the interruption timing is determined from the timing information by determining at least one of: a reference time for the impending interruption according to a reference cell timing in the network 10; a periodicity of the impending interruption; a duration or width of the impending interruption; and a total time period over which the impending interruption will occur. Additionally, or alternatively, the processing circuits 42 are configured to determine the interruption timing from the timing information by determining the interruption timing in terms of a System Frame Number, "SFN", which identifies radio link frames at which system information is transmitted.

Still further, in at least one embodiment, the processing circuits 42 are further configured to perform at least one of: determining whether a timing drift will arise during the impending interruption and, if so, estimating the timing drift; and determining which portion of an overall system bandwidth will be affected by the impending interruption. Correspondingly, in such embodiments, the one or more processing circuits 42 are further configured to adapt the operating configuration further in consideration of the timing drift and/or the affected portion of the overall system bandwidth.

The one or more processing circuits 42, for example, are configured to adjust one or more measurement configuration parameters so that a wireless device 30 operating according to the adjusted measurement configuration parameters will avoid making radio link measurements for the radio link 32 and/or 34 during the impending interruption, and to send the adjusted measurement configuration parameters to the one or more wireless devices 30 as signaling 60.

More broadly, "adapting" the operating configuration at the node 40 comprises changing one or more aspects of its communication operations to avoid performing operations during the interruption that would fail or otherwise be impaired by the interruption. The same or similar type of operating configuration adaptations may be initiated by the node 40 with respect to a neighboring node 40 or at a wireless device 30 via signaling. FIG. 6 illustrates a method 600 of such operation at the node 40. It will be appreciated that the processing circuits 42 of the node 40 may be programmed or otherwise configured to perform the method 600, and that such performance may be repeated and/or performed in parallel, as needed, for one or more recurring interruptions.

The method 600 includes obtaining timing information for an external wireless system 36 whose operation is associated with intermittent interruptions of a radio link 32 and/or 34 of the network 10 (Block 602), and correspondingly determining an interruption timing from the timing information (Block 604). As noted, the interruption timing is referenced to a radio link timing and indicates an impending interruption of the radio link 32 and/or 34 in terms of radio network timing—e.g., subframe/frame timing, etc. The method 600 further includes adapting (Block 606), based on the timing information, an operating configuration at any one or more of the nodes 40, a neighboring node 40, and one or more wireless devices 30 in communication with the network 10, to avoid erroneous operation during the impending interruption.

An example of such a wireless device 30 configured to avoid erroneous operation responsive to signaling 60 from a node 40, e.g., from a base station 16, appears in FIG. 5. The illustrated wireless device 30 is configured for operation with a network 10 and includes a communication interface 70 configured to receive signaling 60 indicating an interruption timing for an impending interruption of a radio link 32 and/or 34, or otherwise including one or more configuration parameters determined in consideration of the interruption timing. Here, "determined in consideration of the impending interruption" means that the values or settings represented by the one or more configuration parameters are chosen to adapt the operation of the wireless device 30 so that erroneous operation is avoided during the interruption. For example, measurement times are configured so that the wireless device 30 does not make signal measurements on the radio link 32 or 34 during the interruption.

The wireless device 30 further includes one or more processing circuits 72, which are labeled as "control and processing circuits" in the diagram. These circuits may be fixed or programmable circuitry, or a mix of both. At least in a functional respect, the one or more processing circuits 72 include an interruption information receiving circuit 74, which can be understood as circuitry that logically functions to recognize and process the signaling 60, so that the operating configuration of the wireless device 30 can be adapted accordingly. The circuitry that "uses" the modified configuration parameters or otherwise "adapts" to the signal modifications is referred to as "using" circuits 76.

In a non-limiting example case, the using circuits 76 comprise circuitry that measures received signal strength or makes other received signal measurements according to a configured timing, and the adaptation comprises altering the timing of measurements with respect to the radio links 32 or 34 involved in the interruption, to avoid making measurements during the impending interruption. To do so, the processing circuits 72 update the corresponding measurement configuration parameters at the wireless device 30 and operate the wireless device 30 according to the modified operating configuration by making signal measurements on the radio link 32 and/or 34 according to the modified operating configuration.

Here, modifying the signal measurement configuration of the wireless device 30 means modifying the measurement configuration so that the wireless device 30 will not sample one or more signals of the radio link 32 and/or 34 during the impending interruption. Additionally, or alternatively, the wireless device 30 modifies its operation according to the received signaling 60, so that it does not perform quality estimation and/or synchronization determination for the radio link 32 and/or 34 during the impending interruption.

In another example, the processing circuits 72 are configured to modify the operating configuration of the wireless device 30 by modifying the operating configuration of the wireless device 30 so that the wireless device 30 omits or defers one or more uplink transmissions to the wireless communication network 10 that otherwise would have coincided with the impending interruption. Additionally, or alternatively, the processing circuits 72 operate radio circuitry of the wireless device 30 in a reduced-power state during the impending interruption—i.e., the wireless device 30 advantageously uses the interruption as an opportunity to save power.

Because the modification or combination of modifications the wireless device 30 is configured to perform can be varied—indeed, some wireless devices may lack the ability to make certain of the operating configuration modifications contemplated herein—it is useful for the wireless device 30 to report is modification capability to the network 10. Thus, in at least one embodiment of the processing circuits 72, they are configured to send capability information to the wireless communication network 10 regarding the capability of the wireless device 30 to modify its operating configuration responsive to the signaling 60 sent from the network 10.

In the same or other embodiments, the one or more processing circuits 72 are configured to modify the operating configuration of the wireless devices 30 by modifying a signal measurement configuration of the wireless device 30 so that the wireless device 30 performs extra measurement sampling during occasions when there is no interruption of signals in a target cell 18 to be measured. A non-limiting advantage of such configurations is that interruptions to the signal(s) in the target cell 18 do not result in the wireless device 30 acquiring fewer measurement samples for the signal(s), because the wireless device 30 collects more samples during non-interrupted times.

Further, in the same or other embodiments, the one or more processing circuits 72 are configured to modify the operating configuration of the wireless devices 30 by modifying uplink power control operation so that the wireless device 30 operates using open-loop control of its transmit power at least initially after the interruption. A non-limiting advantage of such configurations is that the wireless device 30 can resume transmission after an interruption at a power level that is more likely to result in successful signal reception by the network 10, as compared to carrying over a transmit power setting from before the interruption, where that prior setting may be stale or inappropriate for the conditions prevailing after the interruption.

In general, the one or more processing circuits 72 are configured to perform the method 700 as shown in FIG. 7. This configuration is achieved using fixed or programmable circuitry, or some combination of both, for the processing circuits 72.

The illustrated method 700 includes receiving signaling 60 indicating an interruption timing for an impending interruption of a radio link 32 and/or 34, or otherwise including one or more configuration parameters determined in consideration of the interruption timing (Block 702). The method 700 continues with modifying an operating configuration of the wireless device 30 according to the signaling 60 (Block 704), so that the wireless device 30 will avoid erroneous operation during the impending interruption and, correspondingly, operating according to the modified operating configuration (Block 706).

The term "wireless device" should be given broad construction herein. For example, the wireless device 30 may be a user equipment or "UE" configuration for operation in a UTRAN or E-UTRAN network. The wireless device 30 also may be an embedded device, such as a wireless integrated card used in a computer, USB dongles or other network adaptors used with computers, mobile relays, wireless terminals acting as relays, wireless terminals used for device-to-device communication, target devices, and home base stations, "HBSs", or femto base stations, etc. An HBS typically has a measurement unit to measure signal levels—e.g. signal strength, signal quality and acquire system information of another cell, e.g. macro cell.

Of course, the teachings herein are not limited to Long Term Evolution, "LTE". In general, these teachings apply to the operation of the RAN 12 as configured for essentially any RAT, and further apply to single-RAT RANs, multi-RAT RANs, and to multi-carrier CA and CoMP operating scenarios. Example RATs include LTE Frequency Division Duplex or FDD, LTE Time Division Duplex or TDD, UMTS with FDD or TDD, GSM/GERAN/EDGE, cdma2000, etc.

Further, as noted, the external system 36 may be related to medical equipment, radar, system managing nuclear facility, security related equipment etc. The node 40 may operate on frequency that is adjacent to or close to that of the external system 36. Hence the node 40 may have to interrupt its own signal when the sensitive system operates to avoid out of band emission and/or reception of signal, which may disrupt the operation of the node 40 and/or other parts of the network 10.

The signal interruption also can be related to satellite reception or tuning to some transmitter. For example, the network 10 may perform synchronization for positioning services or for synchronizing the network 10 from an external wireless signal. The external source may be a satellite source, e.g. GNSS, GPS, etc., or another node or another system. One example is a network listening method used in small or low output power base stations for acquiring timing for synchronizing to a high power node, e.g., to a macro base station. This technique ensures that nodes 40 in a coverage area are synchronized.

More specifically, a small base station 16 may synchronize to the frame timing of a larger, macro base station 16 by correlating over the signals transmitted by the high power base station 16. This operation may result in signal interruption at the small base station 16, because it may not have additional receiver resources for performing synchronization. Such synchronization generally repeats, to keep the nodes synchronized even with timing drift.

The above details highlight another aspect of the broad applicability of the teachings herein. The node 40 may be an eNB in an LTE network, a Radio Network Controller, "RNC", in a WCDMA network, or some other type of base station, relay or repeater, etc. Further, the node 40 is not necessarily a radio network node; in at least one embodiment, the node 40 comprises a node in the CN 14, such as the PN 24, or any other node that configures wireless devices 30 with respect to performing one or more operations within the network 10. For example, the PN 24 requests wireless devices 30 to perform measurements on one or more cells 18, for positioning related measurements.

With the range of node types contemplated for the node 40, it is also contemplated that the node 40 obtains the timing information for interruptions associated with the external system 36. In one example, the node 40 obtains the timing of the interruptions via explicit indication from another node or nodes. For example, in the case that the node 40 is an eNodeB in an LTE embodiment of the network 10, it obtains the timing information via exchanges between eNodeBs over the X2 inter-base-station interface. Additionally or alternatively, the node 40 as an eNodeB obtains the timing information from the PN 24, e.g., via LTE Positioning Protocol Annex or LPPa. In another embodiment, the node 40 is an eNode in a UTRAN embodiment of the network 10, and it obtains the timing information from an RNC over the Iub interface, or over interfaces between it and an Operations and Maintenance or O&M node, etc. The timing information may be signaled for different carriers, different RATs, etc., and used in the node 40 on a carrier/cell specific basis, e.g., for each carrier used in an eNode B, etc.

In another example, the node 40 is configured to obtain the timing information on its own. For example, if the node 40 is a base station 16 and its downlink and/or uplink signals are interrupted, the base station 16 can track the occurrence of such interruptions and thereby determine the timing of the interruption of the signals. The interruption may also be pre-determined. For example, it may be pre-determined that the node 40 as a base station 16 interrupts its transmissions of signals for 50 ms once every 5 seconds. It may be also be pre-determined whether the base station 16 also interrupts its reception of signals when there is interruption in its transmission of signals.

The node 40 may translate the timing information into interruption timing information for one or more cells 18, to inform the UEs or other wireless devices 30 operating in those cells 18 about the interruptions. For example a wireless device 30 may receive indications from a base station 16 via Radio Resource Control, "RRC", signaling that radio links 32 and/or 34 in a serving cell 18 will be interrupted at certain times. In another example, the wireless device 30 receives indications from the PN 24, e.g., an E-SMLC sends signaling via LPP, that indicate when PRS will be interrupted in a reference cell at certain times. Such information may be sent to the wireless device 30 in the connected state, and also in low activity states, e.g., idle state, CELL_PCH/URA_PCH/CELL_FACH in HSPA, etc.

Also as noted, there is flexibility in how the interruption timing is expressed. It may be provided in terms of a reference time, such as the SFN of a cell 18 for when the interruption will start, a duration of the interruption, such as the number of time units—frames, subframes, slots, etc.— expected for the interruption. The interruption timing information also may indicate the periodicity or repetition interval or frequency of occurrence, etc., at least for cases where the interruptions are indicated or detected as being periodic.

The interruption timing information sent from the node 40 may also indicate maximum and minimum durations of the impending interruption. The interruption timing information may also comprise of an indication whether the cell timing, e.g., uplink frame timing, will be the same or will be drifted after the interruption. In case a drift or change in radio network timing is expected to occur during the interruption, the interruption timing information may also include the amount of drift that would occur. In an example, the interruption timing information indicates that a −2 µs change occurs in the downlink frame timing of a cell 18. Another possibility is that the node 40 sends a timing advance command just after the interruption, to adjust the wireless device timing to the new frame timing. That is, the node 40 may be configured to send a timing advance command that is calculated to account for the timing drift that is known or expected to occur during the interruption.

In case of multi-carrier/CA, CoMP, RRH etc. systems where the wireless device 30 uses multiple links and cells, the network 10 may also apply the same timing change in all cells 18 involved in CA or CoMP operation. Another possibility is that the node 40 may adjust its timing after the interruption to ensure that its frame timing does not change compared to its timing before the drift. The network 10 may also additionally indicate to the wireless device 30 the part of cell bandwidth where signal interruption occurs or alternatively it may indicate the part of cell bandwidth where no signal interruption occurs. The indication of the bandwidth information may be required in case the signal interruption will occur on only part of cell bandwidth. If no such information is provided in the signaling 60, then the wireless device 30 may assume that the interruption occurs over entire bandwidth of the radio link 32 and/or 34.

The interruption timing information provided to the wireless device 30 via the signaling 60 may be common for indicating the interruption of transmission of signals on both radio links 32 and 34 of a given cell 18—i.e., on both the downlink and uplink. The interruption timing information may also be provided separately, for indicating interruptions on the downlink or on the uplink in the cell 18.

As for understanding additional examples of how the node 40 may adapt the operating configuration of a wireless device 30 to avoid erroneous operation by the device during an impending interruption of the radio link 32 and/or 34 in a given cell 18 or cells 18, consider that the signaling 60 may control the wireless device 30 so that does not perform certain tasks during the impending interruption(s), at least with respect to certain cells 18 or carriers and/or with respect to certain RATs, nodes, etc. In one example of this approach, the signaling 60 configures the wireless device 30 so that it does not to perform certain measurements on its serving cell 18 during the interruption(s). For example, the signaling 60 includes one or more configuration parameters that control RSRP and/or and Received Signal Received Quality, "RSRP", measurements.

The signaling 60 may be sent as needed and different signaling 60 may be sent for different interruption timings. This approach is helpful because the interruptions may occur at the same time or at different times in different cells 18 in the network 10. If an interruption occurs at the same time on several cells 18, e.g., serving and neighbor cells 18, then the network 10 can indicate that the signal interruption pattern is common to all cells 18 or to a group of cells 18. In case the signal interruption pattern is cell-specific or not common all to cells 18, then the signaling 60 in one or more embodiments is generated by the node 40 such that it indicates the "signal interruption pattern" of the interruption on a per-cell or per-cell group basis. The signaling 60 thus may include Physical Cell Identifier, "PCI", or other cell-identifying information.

Additionally or alternatively, the node 40 generates the signaling 60 such that it indicates the signal interruption pattern of a reference cell 18 and includes an indicator indicating whether the neighboring cells 18 have the same signal interruption pattern as that of the reference cell 18. The reference cell may be a pre-defined cell 18, such as the serving cell 18 or a reference cell 18 for the wireless device 30, such as used for positioning measurements. In one example, the reference cell 18 is used for Received Signal Time Difference, "RSTD" measurements.

Thus, in at least one embodiment, the wireless device 30 receives information or indications related to the "signal interruption pattern" in one or more cells 18, and modifies its ongoing operations at the interruption time(s), in accordance with the interruption timing information and/or configuration parameters provided in the signaling 60. For example, the wireless device 30 does not sample signals for performing radio link measurements during the interruption in the target cell 18 to be measured. In another example, the wireless device 30 does not perform radio link monitoring related tasks. For example, the wireless device 30 does not perform downlink radio link quality estimation, evaluation of out of sync, "OOS", and in sync, "IS", conditions.

In another example, the wireless device 30 uses a reduced number of measurement samples to report final measurement results to the network 10. That is, the wireless device 30 skips measurement samples that would coincide with the interruption and generates a report for sending despite skipping some measurements. Alternatively, in at least one embodiment, the wireless device 30 performs extra sampling during occasions when there is no interruption of signals in the target cell 18 to be measured. This approach allows the wireless device 30 to take a predetermined number of sample values for a given type of radio link measurement, despite avoiding sampling during interruptions.

As a further example of the wireless device 30 modifying its operating configuration according to the signaling 60, in one or more embodiments the wireless device adapts its signal transmissions according to configuration parameters and/or interruption timing information conveyed by the signaling 60. For example, the wireless device 30 does not transmit signals in the uplink if there is interruption in the corresponding base station reception.

In a similar example, the wireless device 30 sends uplink reports and/or requests from time to time as part of its normal operations. However, in response to the signaling 60, the wireless device 30 does not send any measurement results to its serving cell at times corresponding to the interruption(s). Example reports are Channel State Information, "CSI", reports, RSRP/RSRQ reports, etc. Likewise, the wireless device 30 also may defer scheduling requests, etc., to avoid transmitting during the interruption(s).

In yet another example, the wireless device 30 modifies its operating configuration responsive to the signaling 60 by turning off its receiver and/or transmitter to improve battery life, at least where an indicated interruption affects the serving cell 18 of the wireless device 30. Such interruptions mean that the wireless device 30 does not have to monitor control channels during these interruption occasions, e.g., PDCCH, paging in idle mode, etc., because the wireless device 30 will not be scheduled during such occasions.

It is also contemplated that in some embodiments the wireless device 30 uses the interruption times to perform measurements on one or more cells 18 in which the radio links 32 and/or 34 are not interrupted. For example if the interruption occurs on serving carrier frequency, the wireless device 30 tune its receiver to another frequency at the time(s) its serving cell 18 is indicated as being interrupted, and uses those times to perform inter-frequency and/or inter-RAT measurements. These measurements are different than or complement the usual or normal inter-frequency/Inter-RAT measurement that are known to be performed by wireless devices, as they represent extra opportunities to acquire inter-frequency/inter-RAT measurements. The wireless device 30 may also use such opportunities to perform best effort type measurements, e.g., measurements done in background such as for Self Organizing Networks or "SON" measurements, Minimization of Drive Time or "MDT" measurements, etc.

In at least one embodiment, the wireless device 30 adapts the uplink power control operation before and/or after each interruption in the serving cell 18. For example after an interruption, the wireless device 30 operates its uplink power control in a manner similar to the initial power control used when connecting to the network 10 or when restarting transmission after a certain duration of inactivity, e.g., after inactivity of 20-50 ms or longer. More specifically, the wireless device 30 may operate using open-loop power control principles after the interruption. The wireless device 30 also is configured in some embodiments to perform post-interruption uplink power control similar to initial power control operations in dependence on whether the signal interruption is longer than a defined threshold, e.g., longer than 20 ms. Thus, in an advantageous embodiment, the signaling 60 directly or indirectly indicates the duration of an impending interruption, or the wireless device 30 otherwise determines the duration of the interruption, and it uses initial-connection, open-loop power control for its uplink transmissions coming out of the interruption, if the duration of the interruption exceeds the defined threshold. Otherwise, the wireless device 30 uses the most recent and/or next-received closed-loop power control commands from the network 10.

The wireless device 30 in some embodiments may be configured not to send random access to a cell 18 during the interruption times. The wireless device 30 may also not wait for random access response during the interruption periods. The wireless device 30 may also temporarily stop one or more of the timers over the time period when there is signal interruption in the relevant cell. For example the wireless device 30 may stop its backoff timer used during random access procedures when performing random access to a cell 18. The cell 18 can be the serving cell 18, which is used by acquiring uplink synchronization, positioning measurement, etc., or it can be a neighbor or any target cell 18. The neighbor or any target cell 18 can be accessed by the wireless device 30 for performing a cell change operation, such handover, Primary Cell or PCell change, RRC re-establishment, RRC connection release with redirection to a target cell 18, location area updates, tracking area updates, etc.

In another example of the wireless device 30 modifying its operating configuration in response to the signaling 60, to avoid erroneous operation during the impending interruption, the wireless device 30 freezes its radio link failure timer, e.g., timer T310 in E-UTRAN, over the time period when there is an interruption in its serving cell 18. The wireless device 30 resumes frozen timers after the signal interruption is over. In a corresponding example of the node 40 adapting the operating configuration of a wireless device 30 to avoid erroneous operation during an impending interruption, the signaling 60 sent from the node 40 includes one or more configuration parameters, e.g., Information Elements or IEs, that indicate which of the device's timers are to be temporarily stopped by the wireless device 30. There may also be a pre-defined rule that certain timers, e.g., related to specific procedures, are to be stopped when there is signal interruption in a cell 18, e.g., in serving cell 18. Here, the signaling 60 need only indicate the timing of the impending interruption, so that the wireless device 30 can suspend one or more timers according to the configured rule at the correct time. It may also be a pre-defined that certain types of timers are stopped by the wireless device 30 only when the signal interruption is larger than certain threshold.

The wireless device 30 also may perform synchronization to the serving and/or neighboring cells 18 after an interruption, either based on pre-defined rules and/or based on explicit signaling. The pre-defined rule may require that wireless device 30 always apply synchronization to a cell 18 after an interruption, or for certain interruption characteristics, e.g when interruption duration is longer than a threshold. Such a configuration ensures that the wireless device 30 re-synchronizes to a given cell 18 after an interruption, especially its serving cells 18, which may be a PCell and one or more Secondary Cells or SCells. The wireless device 30 may perform synchronization using existing principles e.g., by correlating signals such as reference signals or synchronization signals transmitted by the cell. In case the network 10 sends the amount of drift in cell timing then the wireless device 30 may adjust its timing according to the received value (e.g., timing advanced command or any other indicator or parameter).

In addition, certain additional rules may be pre-defined to govern wireless device 30 measurement behavior and requirements in response to receiving the signaling 30. The pre-defined rule may require that wireless device 30 always apply certain procedures after signal interruption or for certain signal interruption characteristics, e.g., when signal interruption duration is longer than a threshold.

It may also be pre-defined that due to interruption the wireless device 30 is allowed to meet a second set of measurement requirements or adapt the measurement requirements. For example, the wireless device 30 may be allowed to perform certain measurements over a longer duration than is used in the default case of no interruptions, or may be allowed to relax measurement accuracy, etc., as compared to the interruption-free case. The longer duration allowed for accomplishing particular measurements may be pre-defined or it may be expressed as a function of the signal interruption duration, periodicity, etc. For example it may be pre-defined that the wireless device 30 may perform out-of-sync and in-sync evaluations over 250 ms and 200 ms respectively, when the signal interruption occurs in the serving cell 18 or PCell 18 of the wireless device 30.

It may also be pre-defined if the interruption is longer than certain threshold and/or if the periodicity or frequency of occurrence is shorter than certain threshold, then the wireless device 30 is allowed to meet second set of measurement requirements or adapt the measurement requirements. As in previous example, the second set of measurement requirements may correspond to longer measurement durations or evaluation periods, etc.

It may also be pre-defined that in general the wireless device 30 is allowed to adjust some of its measurement related parameters when there is an indicated interruption in the cell 18 on which measurement is done. It may also be pre-defined that in general the wireless device 30 is allowed to adjust some of its measurement related parameters, provided the signal interruption in the cell 18 on which measurement is known, expected, or measured to be longer than a certain duration and/or its periodicity or frequency of occurrence of signal interruption is more frequent than certain threshold.

The wireless device 30 may report its measurement results to the network 10 after performing the measurements according to the modified operations imposed by the signaling 60. With reference back to the node 40, in one or more contemplated embodiments, the node 40 may not have a way to explicitly indicate to the wireless device 30 regarding the interruption of signals in the network 10, and it is also possible that not all wireless devices are capable of receiving or using such information.

Therefore, it is contemplated herein that the node 40 adapts one or more configuration parameters in the network 10, in addition to or as an alternative to modifications at the wireless device(s) 30. These adaptations avoid erroneous operation with respect to the wireless devices that are unable to recognize or respond to the signaling 60. The examples adapting operating configuration parameters at the node 40 include but are not limited to these items: adapting measurement configuration parameters; adapting scheduling of data; and adapting measurement requests.

Broadly, the node 40 may modify a number of configuration parameters at the node 40, at a neighboring node 40, and/or at a wireless device 30, to avoid erroneous operation during an impending interruption. In one example, the node 40 adjusts the higher layer filtering parameters associated with the relevant measurement(s) made by a wireless device 30 with respect to the radio link 32 and/or 34 in a given cell 18. The higher layer filtering parameters are configured at the wireless device 30 by the network 10, e.g., by the node 40. Consider radio link monitoring, such as out-of-sync and in-sync evaluations, triggering of radio link failure, etc., is performed by the wireless device 30 on the serving cell 18 whose downlink signal is interrupted.

In an example case, the interruption is recurring and lasts more than 50 ms, once every five seconds. In this case, the network 10 may configure higher layer filtering parameters, such as hysteresis counters and/or a radio link failure timer to parameter values different than those used in the normal or usual scenario—i.e., during operations without interruptions arising from an external system 36.

Examples of hysteresis counters are the out-of-sync counter N310 and in-sync counter N311 used in LTE. Similar adjustments can be made for the Radio Link Failure, "RLF", timer T310 used in LTE. For example the network 10 can set N310 to ten seconds and T310 to two seconds, which are values greater than usually used. The longer values ensure that the wireless device 30 does not incorrectly detect 00S or RLF because of the interruptions. The N311 timer on the other hand can be set to a small value, e.g., to a value of one to three. This setting insures that the wireless device 30 quickly recovers from the RLF state when timer T310 is running. Thus, with specific setting of higher layer filtering parameters, the radio link monitoring operation in the wireless device 30 can be adapted so as not trigger radio link failure detection operations and the consequent RRC re-establishment to a new cell 188, during times when the serving cell 18 is interrupted.

In another example when there is signal interruption in a cell 18 to be measured, and the network 10 adapts, adjusts or sets parameters such as the Layer 3 filtering coefficient, time-to-trigger, measurement bandwidth, signal hysteresis, thresholds related to measurement events, etc., or the like, which are used by the wireless device 30 for performing one or more measurements that will be affected by the interruption(s). The measurements as stated above can be intra-, inter-frequency or inter-RAT. The measurements may be performed by the wireless device 30 and/or the node 40 on signals sent by the wireless device 30 and/or on signals sent by another node 40. These parameters are configured by the network 10, based on sending measurement configuration requests as the signaling 60 to the wireless device 30.

In another example, the PN 24 adapts or adjusts positioning related parameters sent to the wireless device 30 or to any target device whose position is to be determined. The adaptation of parameters may comprise one or more of: use of a larger PRS bandwidth for measuring RSTD measurement, use of a larger measurement bandwidth for measuring positioning measurement in general, e.g., Rx-Tx time difference measurements made by the wireless device 30, or for RSTD-based selection of a reference cell 18, where there is no or relatively small signal interruption, etc.

The node 40 also may adjust the wireless device 30 activity level. For example the node 40 may change the discontinuous reception, "DRX", and/or discontinuous transmission, "DTX", cycle of the wireless device 30, in consideration of the interruption timing. The modification of the DRX and/or DTX increases the flexibility for making measurements at the wireless device 30 and/or at the node 40. For example, the node 40 may shorten the DRX cycle when wireless device 30 performs certain specific measurements. Hence the wireless device 30 may perform more frequent sampling of signals sent by the node 40 and avoid or minimize the impact of the absence of such signals during the interruptions. The wireless device 30 in this way can obtain all necessary measurement samples within the desired or pre-defined measurement period. The wireless device 30 can thus perform measurements without or with less deterioration of measurement accuracy, which might otherwise arise if the interruptions were handled simply as missed opportunities for measurement sampling. These techniques also allow the wireless device 30 to report its measurement results to the network 10 within the required time or within an acceptable delay.

Similarly the shortening of the DTX cycle of the wireless device 30 enables the node 40 to perform more frequent measurement sampling of uplink signals. Hence the measurement performance will be met despite interruptions in the signals received at the node 40. For example, the node 40 may make uplink measurements such as propagation delay between wireless device 30 and itself, base station Rx-Tx time difference measurements, etc.

In the same or other embodiments, the node 40 adapts user scheduling in consideration of the interruption timing. That is, scheduling data transmissions to or from the wireless device 30 are adapted to compensate for the loss of data during the interruption times. One approach is for the node 40 to schedule more data to wireless devices 30 in advance of or after the interruption(s). This can be understood as a node 40 adapting its operating configuration in consideration of the interruption timing, so that wireless devices 30 that will be affected by the interruption(s) are not underserved, e.g., with respect to Quality-of-Service, "QoS", requirements that might not otherwise be met if the interruptions were simply handled as lost service opportunities.

In an advantageous extension of this configuration, the flow control of data between the node 40 and a higher network node is adjusted to avoid overwhelming of the buffer in the node 40 during signal interruption periods. For example the node 40 as an eNodeB or other type of base station 16 can request that the CN 14 limit or avoid sending data towards it during or close to a given interruption.

The node 40 also may adapt an operating configuration in consideration of the impending interruption(s) by adapting measurement requests. In an example, the node 40 excludes cells 18 with signal interruption or with more severe interruption (e.g., longer and/or wider bandwidth interruptions) from measurement activities during the interruptions.

The node 40 accomplishes this operation, for example, by sending a measurement configuration message as the signaling 60, in which the measurement configuration message includes configuration parameters or indications that cause the wireless device 30 to modify its operation, to avoid making measurements in the affected cells 18 during the interruptions.

Another contemplated approach is configuring the node 40 to temporarily exclude such affected cells 18 when there is signal interruption or when there is severe signal interruption. Yet another possibility is that the node 40 does not send measurement request to the wireless device 30 for performing certain types of measurements for cells 18 affected by signal interruption. For example, the network 10 may not request a given wireless device 30 to read the System Information, "SI", of a target cell 18, at a time corresponding to the impending interruption, or do so at least in cases if a known or estimated severity of interruption exceeds a defined threshold.

As noted earlier, however, not all of the wireless devices 30 operating in the network 10 may have the capability of modifying their operating configurations to avoid erroneous operation during interruptions. Thus, a wireless device 30 as contemplated herein is configured to send capability information to the network 10. The node 40 can use the received capability information to select the appropriate parameters to modify, as related to particular tasks, procedures, measurement configurations, etc., to be modified at the wireless device 30, to avoid erroneous operation during the interruption. Note, that detecting and responding to a temporary interruption as a radio link failure is considered "erroneous" in the sense that the teachings herein provide a basis for determining the timing and characteristics of such interruptions and managing them as temporary interruptions that are indicated in advance and do not, in general, warrant the triggering of RLF procedures.

A node 40 uses wireless device capability information to determine whether and how the operating configuration of a wireless device 30 should be modified to avoid erroneous operation during an impending interruption. The node 40 also may make the determination based on additional criteria, such as the type of procedure that will be affected by the interruption, the criticality of affected tasks, the characteristics of the interruption in a cell 18, whether the interruption will occur in serving or neighbor cells 18, or both types of cells 18, and/or the type of cell 18, e.g., intra-frequency, inter-frequency, inter-RAT, etc.

The network 10 may send various pieces of relevant information, e.g., the actual interruption timing information, adapted configuration parameters or indications of the adaptions to make, adapted measurement configurations, etc. to the wireless device 30. In cases involving a legacy wireless device that does not support such adaptations, node 40 may adapt certain procedures at the node 40 and/or at neighboring nodes 40, to avoid erroneous operation on the network side in the affected cells 18 during the interruption(s).

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a node in a wireless communication network comprising:
    obtaining timing information for an external wireless system whose operation is associated with intermittent interruptions of a radio link of the wireless communication network;
    determining an interruption timing from the timing information, wherein the interruption timing is referenced to a radio link timing and indicates an impending interruption of the radio link; and
    adapting, with respect to one or more wireless devices in communication with the wireless communication network, user scheduling operations at the node according to the interruption timing, to avoid scheduling transmissions to or from the one or more wireless devices during the impending interruption.

2. A node configured for operation in a wireless communication network, the node comprising communication interface circuitry configured for communicating with one or more other nodes in the wireless communication network and one or more wireless devices in communication with the wireless communication network; and processing circuitry operatively associated with the communication interface circuitry and configured to: obtain timing information for an external wireless system whose operation is associated with intermittent interruptions of a radio link of the wireless communication network; determine an interruption timing from the timing information, wherein the interruption timing is referenced to a radio link timing and indicates an impending interruption of the radio link; and adapt, with respect to the one or more wireless devices in communication with the wireless communication network, user scheduling operations at the node according to the interruption timing, to avoid scheduling transmissions to or from the one or more wireless devices during the impending interruption.

* * * * *